(12) United States Patent
Pilkington

(10) Patent No.: US 8,485,865 B2
(45) Date of Patent: Jul. 16, 2013

(54) GRINDING WHEEL AND METHOD

(75) Inventor: Mark Iain Pilkington, Camby (IN)

(73) Assignee: Rolls-Royce Corporation, Indianapolis, IN (US)

( * ) Notice: Subject to any disclaimer, the term of this patent is extended or adjusted under 35 U.S.C. 154(b) by 375 days.

(21) Appl. No.: 12/191,043

(22) Filed: Aug. 13, 2008

(65) Prior Publication Data

US 2010/0041319 A1   Feb. 18, 2010

(51) Int. Cl.
*B24B 1/00* (2006.01)

(52) U.S. Cl.
USPC .......................................... 451/47; 451/547

(58) Field of Classification Search
USPC .................. 451/47, 51, 547, 48, 49
See application file for complete search history.

(56) References Cited

U.S. PATENT DOCUMENTS

| | | | |
|---|---|---|---|
| 1,702,160 A * | 2/1929 | Hanson | 451/47 |
| 2,307,238 A | 1/1943 | Ross | |
| 2,347,283 A | 4/1944 | Ross | |
| 2,672,713 A * | 3/1954 | Brady | 451/147 |
| 3,023,546 A * | 3/1962 | Beck | 451/120 |
| 4,174,914 A | 11/1979 | Ainoura | |
| 4,299,062 A * | 11/1981 | Junker | 451/547 |
| 4,780,990 A | 11/1988 | Cody, Jr. et al. | |
| 5,146,909 A | 9/1992 | Ruark et al. | |
| 5,573,449 A | 11/1996 | Mackowsky | |
| 5,647,790 A | 7/1997 | Horiutchi et al. | |
| 6,217,409 B1 | 4/2001 | Stadtfeld et al. | |

* cited by examiner

*Primary Examiner* — Robert Rose
(74) *Attorney, Agent, or Firm* — Kreig DeVault LLP

(57) ABSTRACT

A grinding wheel for grinding features into a work-piece and a corresponding method for grinding the features into the work-piece are disclosed herein. The grinding wheel includes an outer periphery with a first axial end having a first diameter. The grinding wheel also includes a second axial end spaced from the first axial end along a centerline axis. The grinding wheel also includes a plurality of discrete grinding projections for removing material from the work-piece. Each of the plurality of discrete grinding projections extends radially outward from the outer periphery and is positioned along the centerline axis in spaced relation to one another. The plurality of grinding projections have working heights that vary relative to one another. In the inventive method, a grinding wheel is rotated about an axis of rotation. The axis of rotation is arranged transverse to and spaced from a centerline axis of an arcuate surface of a work-piece. The grinding wheel and the arcuate surface are moved relative to one another and a plurality of grooves having variable depth are concurrently formed along at least a portion of a perimeter of the arcuate surface with the grinding wheel during at least part of the moving step.

20 Claims, 3 Drawing Sheets

GRINDING WHEEL AND METHOD

BACKGROUND OF THE INVENTION

1. Field of the Invention

The invention relates to a method for forming features in a work-piece with a grinding wheel and the like.

2. Description of Related Prior Art

Grinding is a process by which material is removed from a work-piece by abrasion or friction. The process can be useful in shaping work-pieces that are too hard to be machined by conventional methods such as hardened tool steels and case or induction hardened components. A grinding operation can produce a work-piece having features with a high degree of dimensional accuracy and a superior surface finish.

SUMMARY OF THE INVENTION

In summary, the invention includes a grinding wheel for grinding features into a work-piece and a corresponding method for grinding the features into the work-piece. The grinding wheel includes an outer periphery with a first axial end having a first diameter. The grinding wheel also includes a second axial end spaced from the first axial end along a centerline axis. The grinding wheel also includes a plurality of discrete grinding projections for removing material from the work-piece. Each of the plurality of discrete grinding projections extends radially outward from the outer periphery and is positioned along the centerline axis in spaced relation to one another. The plurality of grinding projections have working heights that vary relative to one another. In the inventive method, a grinding wheel is rotated about an axis of rotation. The axis of rotation is arranged transverse to and spaced from a centerline axis of an arcuate surface of a work-piece. The grinding wheel and the arcuate surface are moved relative to one another and a plurality of grooves having variable depth are concurrently formed along at least a portion of a perimeter of the arcuate surface with the grinding wheel during at least part of the moving step.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EXEMPLARY EMBODIMENT

As will become clear from the detailed disclosure below, the exemplary grinding wheel and exemplary method disclosed herein can improve the efficiency and reduce the cost associated with processing features in arcuate surface by reducing cutting time. The exemplary grinding wheel and method can form grooves in the work-piece such that the finished work-piece defines teeth or splines having the dimensional accuracy and superior surface finish associated with grinding. In addition, the exemplary grinding wheel and method can form grooves in the work-piece as fast or faster than shaping and hobbing processes, without the relatively expensive and easily-worn tools associated with those processes. Thus, the exemplary grinding wheel and method can provide the advantages associated with grinding, shaping, hobbing without the disadvantages or trade-offs associated with these various processes.

Figure 1:
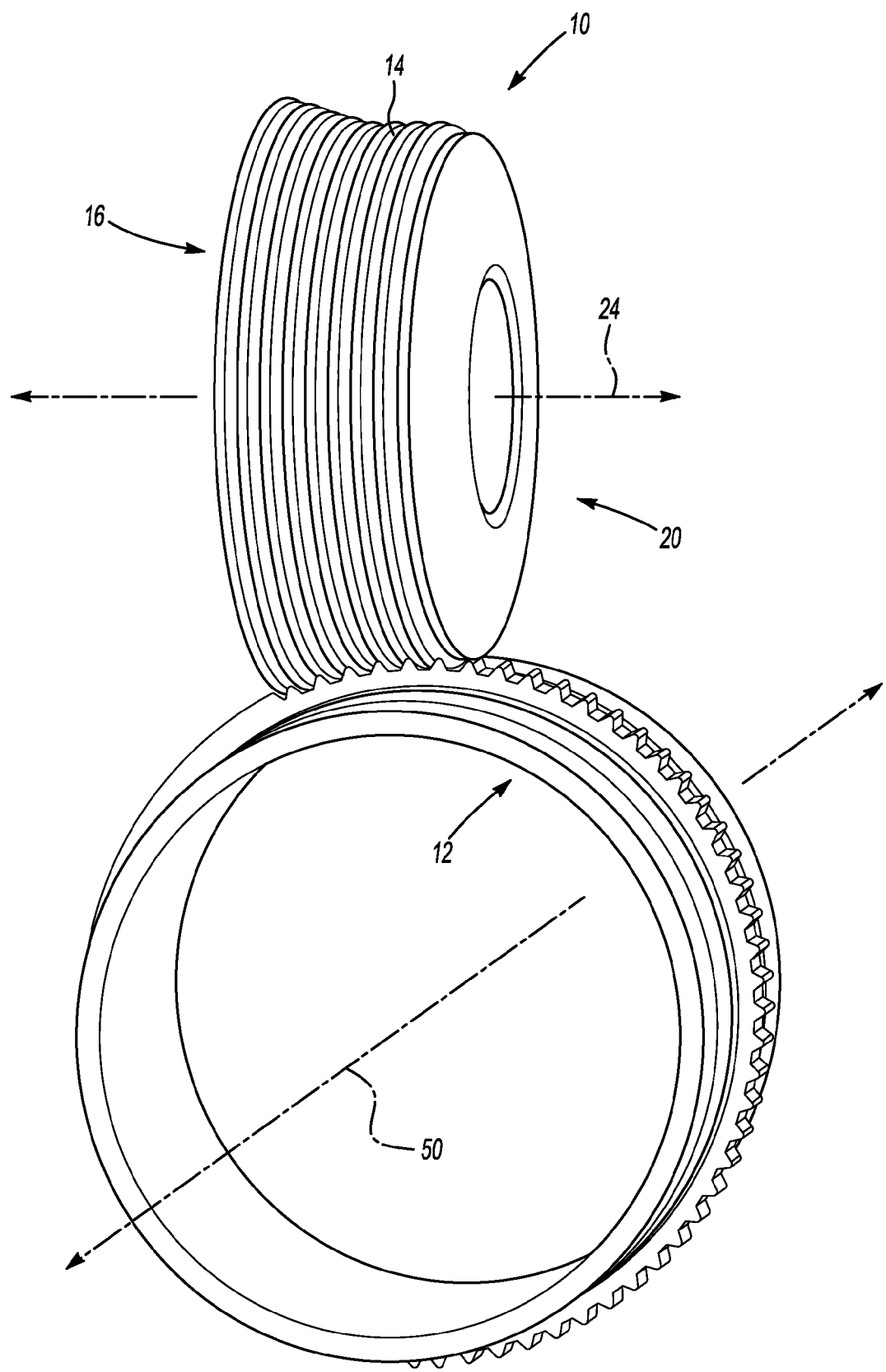
FIG. 1 is a perspective view of a grinding wheel according to an exemplary embodiment of the invention in operation.
Figure 2:
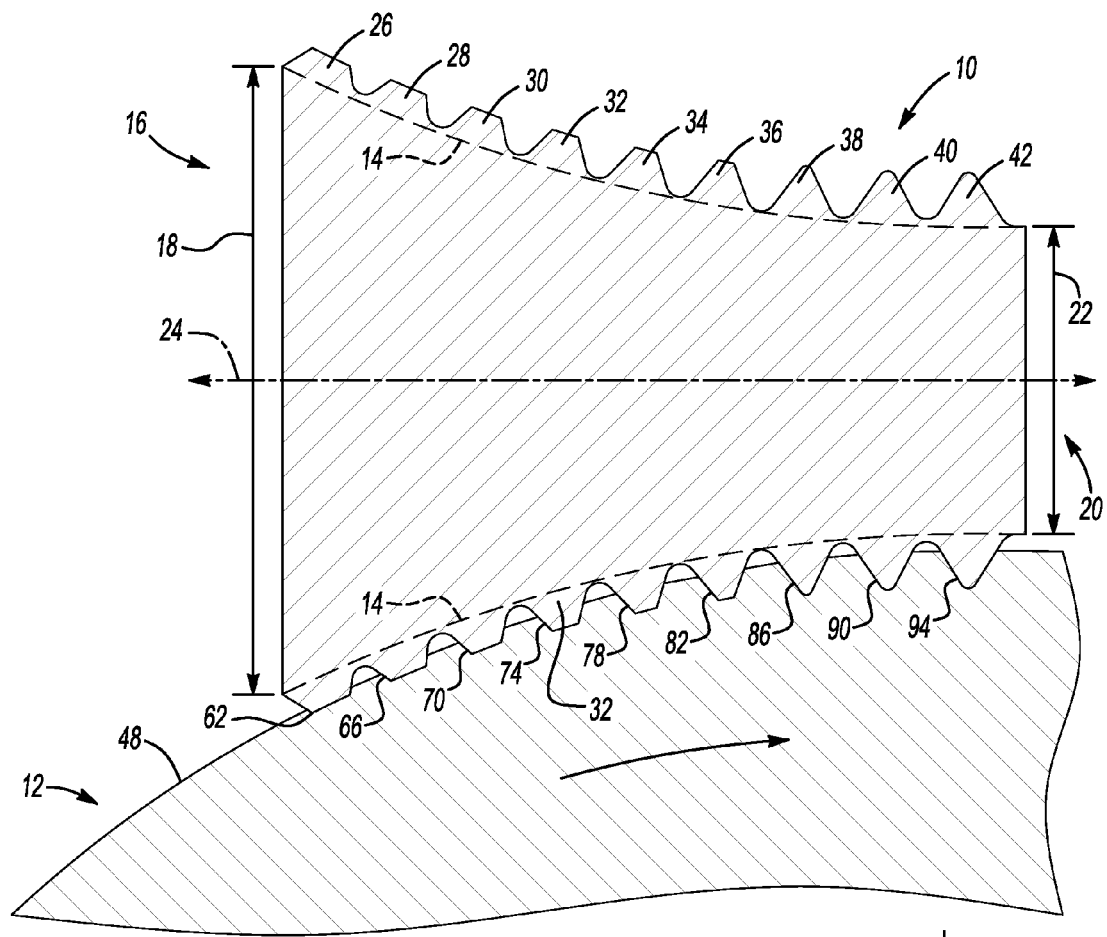
FIG. 2 is a schematic cross section taken in plane containing an axis of rotation of the exemplary grinding wheel.

Referring now to FIGS. 1 and 2, a grinding wheel 10 according to the exemplary embodiment of the invention can grind grooves in work-pieces such as work-piece 12. The work-piece 12 can be a cylinder, a ring, a plate or any structure having a fully or partially arcuate surface to be machined. The features formed can be grooves, slots, splines, functional or non-functional. The machined work-piece 12 thus defines teeth or splines. The grinding wheel 10 can include an outer periphery 14 with a first axial end 16 having a first diameter 18 (shown best in FIG. 2). The grinding wheel 10 can also include a second axial end 20 spaced from the first axial end 16 along a centerline axis 24. The centerline axis 24 can be the axis of rotation for the grinding wheel 10. The second axial end 20 can have a second diameter 22 (shown best in FIG. 2) smaller than the first diameter 18. The exemplary outer periphery 14 is generally funnel-shaped, however could be other shapes in alternative embodiments of the invention such as frusto-conical.

Referring now only to FIG. 2, the grinding wheel 10 also includes a plurality of discrete grinding projections 26-42 for removing material from a work-piece 12. The exemplary grinding wheel 10 includes nine projections, but alternative embodiments of the invention can be practiced with less or more than nine projections. Between three and fifteen projections may provide a desirable balance between the functionality and the cost of a grinding wheel according to an embodiment of the broader invention.

Figure 3:
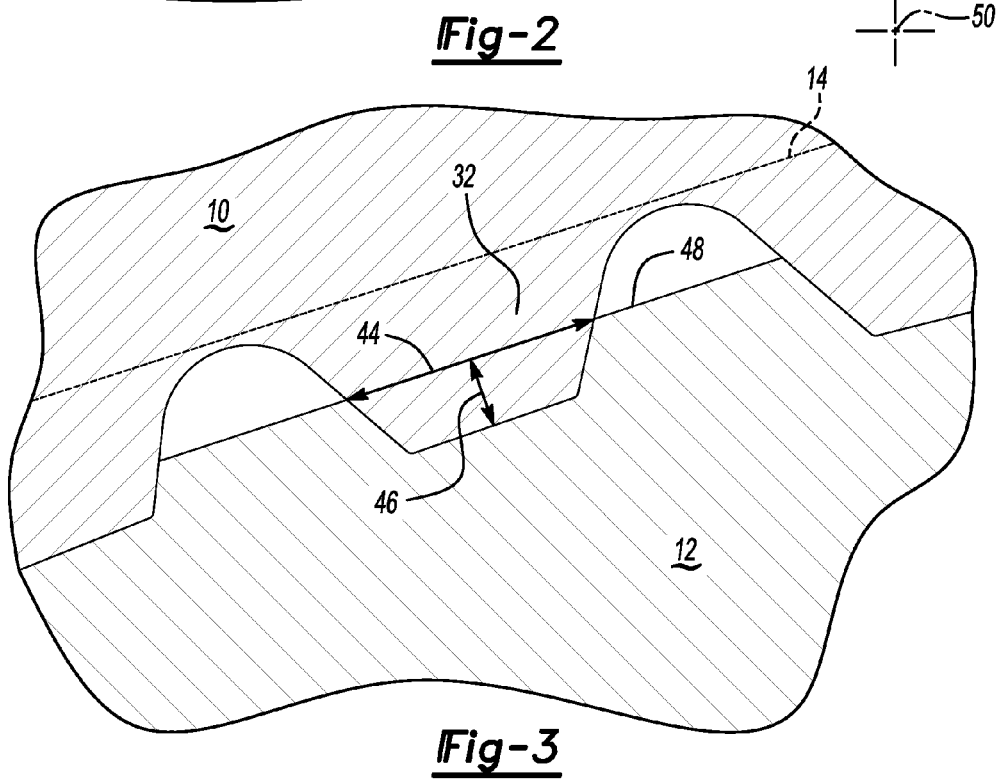
FIG. 3 is a magnified portion of FIG. 2.

Each of the plurality of discrete grinding projections 26-42 can extend radially outward from the outer periphery 14. The grinding projections 26-42 can be positioned along the centerline axis 24 in spaced relation to one another. The plurality of grinding projections 26-42 have variable working heights. Referring now to FIG. 3, the grinding projection 32 is shown penetrating the work-piece 12. The grinding projection 32 defines a width represented by arrow 44 and a working height represented by arrow 46. The respective widths of the grinding projections 26-42 shown in FIG. 2 are defined at the outer surface 48 of the work-piece 12. The respective working heights of the grinding projections 26-42 are defined as the depth of penetration into the work-piece 12, the radial distance between the outer surface 48 and a distal end of the respective projection. The exemplary grinding projections 26-42 are not hob tooth-like in that the projections 26-42 are continuous around the axis 24. The exemplary grinding projections 26-42 are not threads in that the projections 26-42 are not helical.

Figure 5:
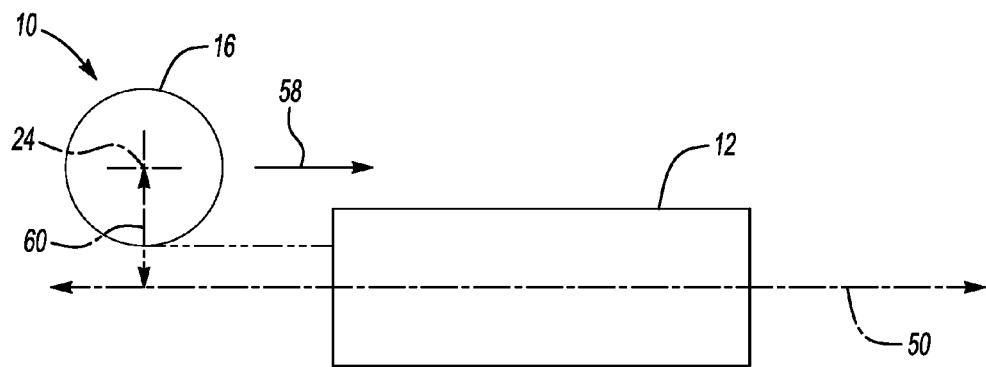
FIG. 5 is a schematic illustration of the exemplary grinding wheel and work-piece in a plane perpendicular to the plane of view in FIG. 2.

Generally, to perform a grinding operation, the grinding wheel 10 can be rotated about the axis 24 and moved across the work-piece 12 in a grinding pass such that the grinding projections 26-42 remove material from the work-piece 12 to form grooves. The axis 24 of the grinding wheel 10 can be arranged transverse to and spaced from a centerline axis 50 of the arcuate outer surface 48. With reference to the viewing perspective of FIG. 2, the grinding wheel 10 can be positioned in the foreground and the work-piece 12 can be positioned in the background. The grinding wheel 10 and work-piece 12 can be initially spaced from one another such as shown in FIG. 5. After the grinding wheel 10 has begun to rotate, the grinding wheel 10 and work-piece 12 can be moved closer to one another (either or both being moved) so that the grinding projections 26-42 shown in FIG. 2 can remove material from the work-piece 12.

Figure 4:
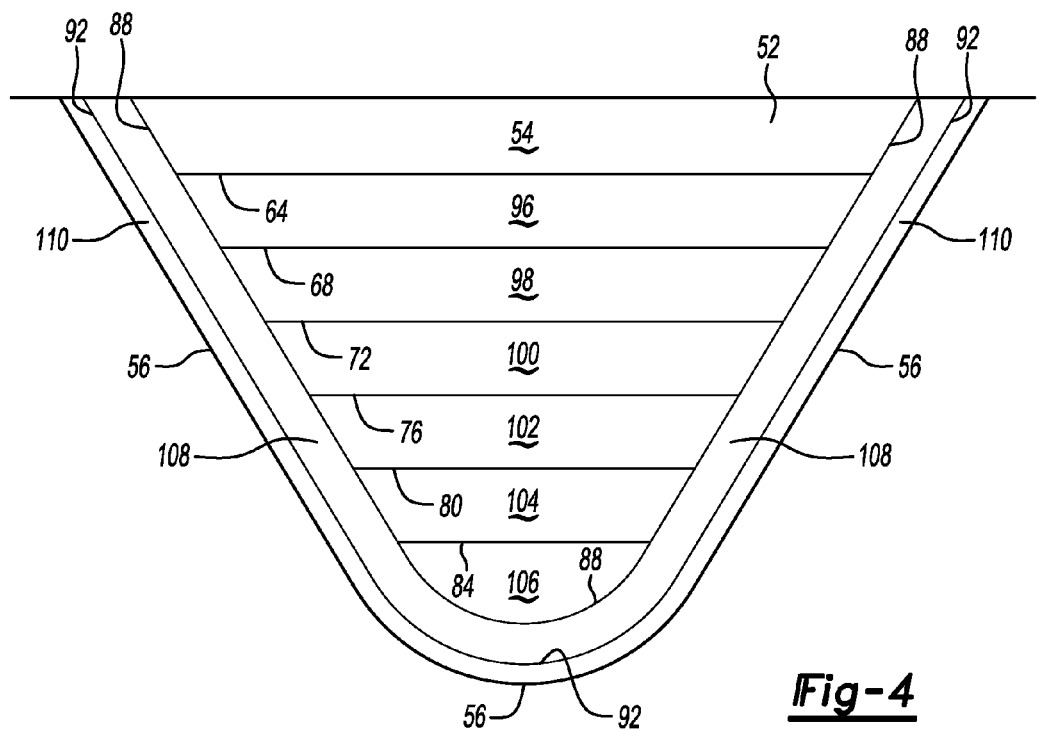
FIG. 4 is a schematic illustrating a series of sequential grinding passes made by the exemplary grinding wheel to form a groove in a work-piece.

In the exemplary embodiment of the invention, the working heights of the plurality of grinding projections 26-42 can increase from the first axial end 16 to the second axial end 20. In other words, the depth of penetration into the work-piece 12 can increase with each successive grinding projection from the grinding projection 26 to the grinding projection 42. FIG. 4 is a schematic illustrating cross-sectional portions of material removed from the work-piece 12 by the grinding projections 26-42. The line 52 corresponds to the outer surface 48 shown in FIG. 2. Area 54 in FIG. 4 corresponds to the cross-section of material that can be removed from the work-piece 12 by the grinding projection 26 shown in FIG. 2. The area bounded by lines 52 and 56 in FIG. 4 corresponds to the cross-section of material that can be removed from the work-piece 12 by the grinding projection 42 shown in FIG. 2.

During an initial stage of processing, the grinding wheel 10 can be passed across the work-piece 12 in several different ways to create the first grooves formed in the work-piece 12. As set forth above, the grinding wheel 10 and the work-piece 12 can be moved closer to one another so that the grinding projections 26-42 increasingly penetrate the work-piece 12 during a grinding pass. Referring now to FIG. 5, the grinding wheel 10 can be moved in a direction represented by arrow 58 across all or part of the work-piece 12 to complete a grinding pass. Alternatively, the work-piece 12 can be moved in a direction opposite to the direction represented by arrow 58, toward a rectilinearly-fixed but rotating grinding wheel 10, or the grinding wheel 10 and work-piece 12 can both be moved closer to each other.

To create the first grooves formed in the work-piece 12, the relative movement between the grinding wheel 10 and the work-piece 12 can be a single pass or can be a series of passes wherein a distance between the axis 24, 50 represented by arrow 60 is steadily decreased with each pass. The initial stage of processing, by a single pass or by multiple passes, can be complete when the first grooves are formed to respective depths defined by the respective grinding projection 26-42 (shown in FIG. 2). Referencing between FIGS. 2 and 4, a first initial groove 62 shown in FIG. 2 having depth corresponding to line 64 shown in FIG. 4 can be formed in the work-piece 12 by the grinding projection 26 shown in FIG. 2. An amount of material removed from the work-piece 12 by the grinding projection 26 is represented by the cross-sectional area 54 in FIG. 4. The area 54 is bounded by the lines 52 and 64 at the top and bottom, respectively, and by line 88 on both sides.

A second initial groove 66 shown in FIG. 2 having depth corresponding to line 68 shown in FIG. 4 can be formed in the work-piece 12 by the grinding projection 28 shown in FIG. 2. An amount of material removed from the work-piece 12 by the grinding projection 28 is represented by the cross-sectional area 96 in FIG. 4 as well as the cross-sectional area 54. The area 96 is bounded by the lines 64 and 68 at the top and bottom, respectively, and by line 88 on both sides.

A third initial groove 70 shown in FIG. 2 having depth corresponding to line 72 shown in FIG. 4 can be formed in the work-piece 12 by the grinding projection 30 shown in FIG. 2. An amount of material removed from the work-piece 12 by the grinding projection 30 is represented by the cross-sectional area 98 in FIG. 4, as well as the areas 54 and 96. The area 98 is bounded by the lines 68 and 72 at the top and bottom, respectively, and by line 88 on both sides.

A fourth initial groove 74 shown in FIG. 2 having depth corresponding to line 76 shown in FIG. 4 can be formed in the work-piece 12 by the grinding projection 32 shown in FIG. 2. An amount of material removed from the work-piece 12 by the grinding projection 32 is represented by the cross-sectional area 100 in FIG. 4, as well as the areas 54, 94, and 98. The area 100 is bounded by the lines 72 and 76 at the top and bottom, respectively, and by line 88 on both sides.

A fifth initial groove 78 shown in FIG. 2 having depth corresponding to line 80 shown in FIG. 4 can be formed in the work-piece 12 by the grinding projection 34 shown in FIG. 2. An amount of material removed from the work-piece 12 by the grinding projection 34 is represented by the cross-sectional area 102 in FIG. 4, as well as the areas 54, 94, 98, and 100. The area 102 is bounded by the lines 76 and 80 at the top and bottom, respectively, and by line 88 on both sides.

A sixth initial groove 82 shown in FIG. 2 having depth corresponding to line 84 shown in FIG. 4 can be formed in the work-piece 12 by the grinding projection 36 shown in FIG. 2. An amount of material removed from the work-piece 12 by the grinding projection 36 is represented by the cross-sectional area 104 in FIG. 4, as well as the areas 54, 94, 98, 100, and 102. The area 104 is bounded by the lines 80 and 84 at the top and bottom, respectively, and by line 88 on both sides.

A seventh initial groove 86 shown in FIG. 2 having depth corresponding to the bottom-most portion of line 88 shown in FIG. 4 can be formed in the work-piece 12 by the grinding projection 38 shown in FIG. 2. An amount of material removed from the work-piece 12 by the grinding projection 38 is represented by the cross-sectional area 106 in FIG. 4, as well as the areas 54, 94, 98, 100, 102, and 104. The area 106 is bounded by the lines 84 at the top and by line 88 along the bottom and both sides.

An eighth initial groove 90 shown in FIG. 2 having depth corresponding to the bottom-most portion of line 92 shown in FIG. 4 can be formed in the work-piece 12 by the grinding projection 40 shown in FIG. 2. An amount of material removed from the work-piece 12 by the grinding projection 40 is represented by the cross-sectional area 108 in FIG. 4, as well as the areas 54, 94, 98, 100, 102, 104, and 106. The area 108 is bounded by the lines 88 and 92 along the sides and bottom and at the top by line 52.

A ninth initial groove 94 shown in FIG. 2 having depth corresponding to the bottom-most portion of line 56 shown in FIG. 4 can be formed in the work-piece 12 by the grinding projection 42 shown in FIG. 2. An amount of material removed from the work-piece 12 by the grinding projection 42 is represented by the cross-sectional area 110 in FIG. 4, as well as the areas 54, 94, 98, 100, 102, 104, 106, and 110. The area 110 is bounded by the lines 92 and 56 along the sides and bottom and at the top by line 52.

After the initial stage in which the first grooves 62, 66, 70, 74, 78, 82, 86, 90, 94 are formed to varying depths, the grinding wheel 10 can be applied to create more grooves and to modify and finish the first grooves 62, 66, 70, 74, 78, 82, 86, 90. The groove 94 can be finished during the initial stage. In one method for removing additional material from the work-piece 12 after the initial stage, the grinding wheel 10 can be moved to position spaced from the work-piece 12 and the work-piece 12 can be rotated about the axis 50. The work-piece 12 can be rotated an angle equal to an angle between adjacent grinding projections 26-42. The grinding wheel 10 and work-piece 12 can then be moved closer together again so that the grinding projections 26-42 can remove material from the work-piece 12.

Referencing again between FIGS. 4 and 2, during passage of the grinding wheel 10 across the work-piece 12 in a second stage after the initial stage, the grinding projection 28 can engage the work-piece 12 and deepen the groove 62. The groove 62 shown in FIG. 2 can be deepened from the depth represented by line 64 in FIG. 4 to the depth represented by line 68 in FIG. 4. An amount of material represented by area 96 can be removed from the work-piece 12 shown in FIG. 2 during passage of the grinding projection 28 through the groove 62.

Similarly, the grinding projection 30 in FIG. 2 can deepen the groove 66 shown in FIG. 2 from the depth represented by line 68 in FIG. 4 to the depth represented by line 72 in FIG. 4, removing the material represented by area 98. The grinding projection 32 in FIG. 2 can deepen the groove 70 shown in FIG. 2 from the depth represented by line 72 in FIG. 4 to the depth represented by line 76 in FIG. 4, removing the material represented by area 100. The grinding projection 34 in FIG. 2 can deepen the groove 74 shown in FIG. 2 from the depth represented by line 76 in FIG. 4 to the depth represented by line 80 in FIG. 4, removing the material represented by area 102. The grinding projection 36 in FIG. 2 can deepen the groove 78 shown in FIG. 2 from the depth represented by line 80 in FIG. 4 to the depth represented by line 84 in FIG. 4, removing the material represented by area 104. The grinding projection 38 in FIG. 2 can deepen the groove 82 shown in FIG. 2 from the depth represented by line 84 in FIG. 4 to the depth represented by line 88 in FIG. 4, removing the material represented by area 106.

The grinding projection 40 can both deepen and widen the groove 86 from the cross-sectional perimeter bounded by the lines 88 and 52, to cross-sectional perimeter bounded by the lines 92 and 52, removing the material represented by area 108. The grinding projection 42 can both deepen and widen the groove 90 from the cross-sectional perimeter bounded by the lines 92 and 52, to cross-sectional perimeter bounded by the lines 56 and 52, removing the material represented by area 110. The grinding projection 42 can be viewed generally as a "finishing" portion of the grinding wheel 10 and the grinding projections 26-40 can be viewed generally as "forming" and/or "groove enlarging" portions of the grinding wheel 10.

The various grinding projections 26-42 can be shaped such that at least some of the grinding projections 26-42 remove substantially the same depth of material from the work-piece 12. For example, the grinding projections 26-36 can define respective truncated-triangular cross-sections with working heights increasing at a substantially constant rate along the centerline axis 24. The grinding projection 38 can also increase in height over the grinding projection 36 at the same rate as the grinding projections 26-36. The grinding projections 38-42 define respective triangular cross-sections. The working heights among the grinding projections 38-42 can change relative to one another at a decreasing rate along the centerline axis 24. Generally, the desired precision of material removal increases at the second axial end 20 of the grinding wheel 10 and thus the rate of change in working height decreases.

The plurality of grinding projections 26-42 can have variable widths. The widths of the exemplary grinding projections 26-42 increase from the first axial end 16 to the second axial end 20. The widths of the grinding projections 26-38 are substantially the same size along the centerline axis 24 and increase between the grinding projections 38-42 along the centerline axis 24. Each of the grinding projections 26-38 leave a small amount of material on opposite sides of the grooves so that any misalignment between the grinding projections 26-38 is not especially problematic. After the grinding projection 38, it can be desirable to remove an even amount of material all around the groove. Most of this material can be removed by the grinding projection 40, leaving just a small amount of material. The grinding projection 42 can remove this material with a lower depth of cut than the previous the grinding projection 40 to provide a good finished surface in the groove.

During the second stage of use of the exemplary grinding wheel 10, grooves are can be concurrently formed, modified and finished. Grinding can simultaneously occur in which one groove is initially-formed, other grooves are enlarged, and one groove is finished. Initially forming and finishing can occur concurrently during the initial stage as well.

The final stage of processing the work-piece 12 into a finished article can be accomplished in at least two different ways in the exemplary embodiment of the invention. After all the desired grooves are formed in the arcuate surface 48 about the centerline axis 50, the grinding projection 42 will be the only grinding projection engaged with the work-piece 12, resulting in less cutting force. If this change in cutting force is sufficient to create an accuracy problem, the process can be repeated around the already-formed work-piece 12 so that all of the grooves receive a final finishing cut with only grinding projection 42 engaged. Although this adds some cycle time it is still much faster overall than conventional methods. Alternatively, a small offset between the position of the axes 24, 50 can be applied during the initial stage and second stage. This offset can be eliminated during a final stage of grinding so that, for finishing, a known amount of material will be removed from each groove. With reference to FIG. 4 for example, the offset can be chosen such that during initial and second stage processing, the grooves will be formed to a depth between the lines 56 and 92. During the final stage, the grinding wheel 10 and work-piece 12 shown in FIG. 2 can be moved closer together and moved relative to one another such that the grinding projection 42 can be passed through each groove to remove material to the line 56 in FIG. 4.

EXAMPLE

An article was formed from a work-piece using a grinding wheel according to an exemplary embodiment of the invention. The article included one hundred and twelve splines and was previously conventionally machined using a shaping process. The shaping process required to produce the article lasted two hours and was difficult to integrate on a machining center, resulting in additional operations and machines in order to achieve the desired dimensional accuracy. When the grinding wheel according to an exemplary embodiment of the invention was applied, the article was produced in twenty minutes, an eighty-three percent reduction in processing time. Also, the grinding wheel according to an exemplary embodiment of the invention could be integrated on the machining center. Alternative embodiments of the invention can be practiced to produce different articles. The benefits derived or perceived from this example may not be realized in all embodiments of the invention. Furthermore, it is noted that the benefits set forth herein are not exhaustive, other benefits may be perceived in the practice of embodiments of the invention. The benefits associated with the exemplary embodiment and described herein are not limitations of the broader invention, but rather demonstrate industrial applicability.

The abrasive grains and bond of the grinding wheel 10 can be selected based on the material of the work-piece 12, the operating environment in which the grinding wheel 10 is used, or any other consideration. The exemplary grinding wheel 10 is shown generally as a single, unitary structure. However, in alternative embodiments of the invention, the grinding wheel can be a plurality of grinding wheels fixed together. Also, a grinding wheel according to an embodiment of the invention could be formed to have different grinding properties along the axis of rotation. The hardness of the grinding wheel at one axial end can be different than the hardness of the grinding wheel at the other end. For example, the grinding wheel 10 can have a bond at the first axial end 16 that allows abrasives grains to fracture easily, classified as a "soil bond", since a soil bond will allow the grinding wheel 10 to cut into the work-piece easily. The grinding wheel 10 can have a bond at the second axial end 20 that restricts the fracturing of the abrasive grains, classified as "hard bonds", since a harder wheel can produce finer surface finishes.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A grinding wheel for grinding work-pieces comprising:
   an outer periphery with a first axial end having a first diameter and a second axial end spaced from said first axial end along a centerline axis and having a second diameter; and
   a plurality of discrete grinding projections for removing material from a work-piece, each of said plurality of discrete grinding projections extending radially outward from said outer periphery and positioned along said centerline axis in spaced relation to one another, said plurality of grinding projections having working heights that vary relative to one another,
   wherein said working heights of said plurality of grinding projections change at a first rate along a first portion of said centerline axis and change at a second rate different from said first rate along a second portion of said centerline axis adjacent to said first portion, at least one of the first rate and the second rate providing a successive decrease in the amount of the material removed from the work-piece by two or more successive projections, and at least the grinding projection having the shortest working height including an angular grinding profile comprised of substantially straight line segments.

2. The grinding wheel of claim 1 wherein said plurality of discrete grinding projections have maximum widths extending in a direction substantially normal to said working heights, the maximum widths of the grinding projections along the first portion of said centerline axis is substantially constant, and the maximum widths of the grinding projections along the second portion of said centerline axis successively increases.

3. The grinding wheel of claim 1 wherein said working heights of said plurality of grinding projections change at a substantially constant rate along at least part of said centerline axis.

4. The grinding wheel of claim 1 wherein said first rate is substantially constant and the different rate is less than said first rate.

5. The grinding wheel of claim 1 wherein said plurality of grinding projections have widths that vary relative to one another.

6. The grinding wheel of claim 5 wherein said widths of said plurality of grinding projections increase from said first axial end to said second axial end.

7. The grinding wheel of claim 5 wherein said widths of said plurality of grinding projections are the same size along a first portion of said centerline axis and change size along a second portion of said centerline axis adjacent to said first portion.

8. The grinding wheel of claim 1 wherein said outer periphery is substantially funnel-shaped with said second diameter being smaller than said first diameter.

9. The grinding wheel of claim 1 wherein at least one of said plurality of grinding projections defines a truncated-triangular cross section and at least one of said plurality of said plurality of grinding projections defines a substantially triangular cross-section.

10. The grinding wheel of claim 1 wherein said plurality of grinding projections include between three and nine projections.

11. A method for grinding features into a work-piece comprising the steps of:
    rotating a grinding wheel about an axis of rotation;
    arranging the axis of rotation transverse to and spaced from a centerline axis of an arcuate surface of a work-piece;
    moving the grinding wheel and the arcuate surface relative to one another; and
    concurrently shaping a plurality of grooves having varying depth along at least a portion of a perimeter of the arcuate surface with the grinding wheel during at least part of said moving step such that depths of said plurality of grooves change at a first rate along a first portion of said arcuate surface and change at a second rate different from said first rate along a second portion of said arcuate surface adjacent to said first portion.

12. The method of claim 11 wherein said moving step further comprises the steps of:
    passing the grinding wheel across the arcuate surface in a first stroke to form the plurality of grooves having variable depth;
    rotating the arcuate surface about the centerline axis to align at least some of the plurality of grooves with different portions of the grinding wheel; and
    passing the grinding wheel across the arcuate surface in a second stroke to change the shapes of the at least some of the plurality of grooves.

13. The method of claim 11 wherein said concurrently shaping step further comprises the concurrent steps of:
    forming a first of the plurality of grooves out of the arcuate surface; and
    finishing a second of the plurality of grooves.

14. The method of claim 11 wherein said concurrently shaping step further comprises the step of:
    removing substantially the same depth of material from two adjacent grooves.

15. The method of claim 11 wherein said concurrently shaping step further comprises the concurrent steps of:
    forming a first groove having a first depth in the arcuate surface with a first portion of the grinding wheel;
    forming a second groove having a second depth greater than the first depth in the arcuate surface directly adjacent to the first groove with a second portion of the grinding wheel; and
    forming a third groove having a third depth greater than the second depth in the arcuate surface directly adjacent to the second groove with a third portion of the grinding wheel.

16. The method of claim 11 wherein said concurrently shaping step further comprises the concurrent steps of:
- deepening and widening a first groove of the plurality of grooves; and
- only deepening a second groove immediately adjacent to the first groove.

17. The method of claim 11 wherein said moving step further comprises the steps of:
- passing the grinding wheel across the arcuate surface in a first grinding stroke;
- rotating the arcuate surface about the centerline axis to align each of the plurality of grooves with a different portion of the grinding wheel after said passing step;
- repeating said passing and rotating steps until a desired number of grooves are formed in the arcuate surface about the centerline axis;
- reducing a distance between the axis of rotation and the centerline axis;
- passing a finishing portion of the grinding wheel through one of the plurality of grooves in the arcuate surface in a second grinding stroke;
- rotating the arcuate surface about the centerline axis to align another of the plurality of grooves in the arcuate surface with the finishing portion of the grinding wheel after the second passing step; and
- repeating the second passing and rotating steps until all of the grooves in the arcuate surface are finished.

18. The method of claim 11 wherein said moving step further comprises the steps of:
- passing the grinding wheel across the arcuate surface in a shaping stroke;
- rotating the arcuate surface about the centerline axis to align each of the plurality of grooves with a different portion of the grinding wheel after said passing step;
- repeating said passing and rotating steps until a desired number of grooves are formed in the arcuate surface about the centerline axis;
- sequentially passing a finishing portion of the grinding wheel through each of the formed grooves after said repeating step.

19. An apparatus for practicing the method of claim 11 comprising the grinding wheel of claim 1.

20. The apparatus of claim 19 wherein said outer periphery is substantially funnel-shaped with said second diameter being smaller than said first diameter and wherein said working heights of said plurality of grinding projections increase from said larger first axial end to said smaller second axial end.

\* \* \* \* \*

UNITED STATES PATENT AND TRADEMARK OFFICE
CERTIFICATE OF CORRECTION

PATENT NO. : 8,485,865 B2  Page 1 of 1
APPLICATION NO. : 12/191043
DATED : July 16, 2013
INVENTOR(S) : Mark Iain Pilkington It is certified that error appears in the above-identified patent and that said Letters Patent is hereby corrected as shown below:

Title Page, Item (74) Attorney, Agent, or Firm--: please replace "Kreig DeVault LLP" with "Krieg DeVault LLP".

Signed and Sealed this
Fifteenth Day of December, 2015

Michelle K. Lee
*Director of the United States Patent and Trademark Office*